Patented May 8, 1934

1,958,295

UNITED STATES PATENT OFFICE 1,958,295

FOOD PRODUCT

Carl W. Christensen and Victor Conquest, Chicago, Ill., assignors to Armour and Company, Chicago, Ill., a corporation of Illinois No Drawing. Application September 6, 1932, Serial No. 631,889

3 Claims. (Cl. 99—11)

The present invention relates to food products for animal consumption, and has particular reference to an improved food product made from milk.

In the feeding of certain domestic animals it is customary to employ the skimmed milk which, to a certain extent, constitutes a waste product of the dairy industry. Whole milk is an ideal food for calves, but in the dairy industry it is necessary to separate the cream or butter fat from the milk for human consumption. Separation of the butter fat from the milk leaves a product which, although edible, is of little nutritive value.

It has been suggested heretofore to incorporate with the skimmed milk a tri-glyceride fat, such as cocoanut oil. Oils or fats or this character are mixed with the skimmed milk with considerable difficulty, it being necessary to emulsify the oil in the milk by passing a mixture of the two through a colloid mill or the like. The tri-glycerides customarily employed in these prior art processes are those which melt at a relatively low temperature, in order that the fat will not crystallize out of and separate from the skimmed milk.

A primary object of the present invention is to produce a milk product containing a fat which will not separate from the milk.

An additional object is to provide a milk product for calves and the like which may be compounded by the user without special means.

A further object is the provision of a milk product containing a soluble fat.

These and other objects will be apparent from a consideration of the following description.

In accordance with our invention the butter fat content of milk is separated, for example, by skimming or centrifugal separation, and the skimmed milk is combined with a water-soluble fatty acid ester of a polyvalent alcohol, the ester containing one or more free hydroxyl groups. Representative of this group of compounds which we have found particularly desirable for use in accordance with our invention are mono and di-stearates of glycerol, and mono and di-palmitates of glycerol. It is also desirable to employ mono-palmitate of glycol and mono-stearate of glycol. While the materials specified represent esters of the saturated fatty acids, it is also possible to use the unsaturated esters, such as mono or di-oleate of glycerol and mono-oleate of glycol.

These materials may be described by the following formulæ, in which OOC.R represents the fatty acid radical, preferably above the $C_6$ series:

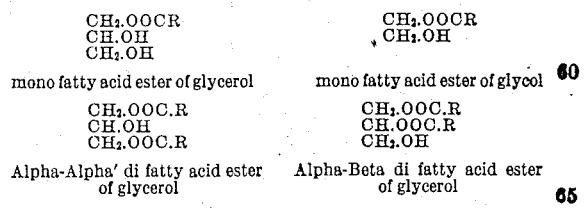

The fats which we employ are easily dissolved in the milk product, it being necessary only to mix the fat with the milk and to agitate until the solution is formed. This makes it possible for the user of the milk product to compound the same immediately before using. For example, in the dairy industry, a supply of the fat may be maintained at the dairy and directly mixed with the skimmed milk prior to its being fed to the calves, hogs or poultry. Where tri-glycerides, such as have been used heretofore, are employed as a substitute for cream in milk, it is necessary to put the milk and fat through an emulsifying process to obtain a stable suspension. As livestock feeders are not ordinarily equipped with emulsification apparatus, it is necessary to produce milk products containing tri-glycerides at a manufacturing plant and to ship the product containing both the milk and the tri-glycerides to the user. In accordance with our invention, it is possible to prepare the fat at manufacturing plants and to ship the fat to the feeder for compounding.

In one modification of our invention one or more fats of the type described are made into a plastic mass by the addition of a sufficient quantity of water. To this mass may be added tri-glycerides, mineral supplements such as calcium phosphates, calcium lactate, and vitamin concentrates. This plastic mass may be added to the skimmed milk or it may be combined with milk powder or concentrated skimmed milk and brought up to the proper consistency by the addition of water. The materials go into solution in the milk very readily, simple hand agitation being sufficient to cause a quick dispersion.

The proportions of the fat and the skimmed milk can be properly regulated to provide the desired percentage of fat substance, it being preferred to closely approximate the percentage of fat substance found in normally whole milk. The percentage of fat may be varied with the age of the animal and its ability to assimilate the food.

Extensive tests with calves and hogs have shown that our product is satisfactorily assimilated and produces a high quality of meat.

It will be understood that our invention is subject to modification. For example, the fatty material may be mixed with powdered or concentrated milk and brought to the proper consistency when desired by the addition of a suitable quantity of water. All such variations are intended to be included in the appended claims.

We claim:

1. A food product for feeding calves comprising skimmed milk containing one or more substances from the group consisting of mono and di-stearates and palmitates of glycerol, mono-palmitate and stearate of glycol, mono and di-oleates of glycerol, and mono-oleates of glycol, said food product having a fluidity substantially the same as normal whole milk.

2. A process for producing livestock feed, which comprises separating butter fat from whole milk to form skimmed milk, and adding to said skimmed milk, in an amount substantially equal to the natural fat content of whole milk, a water-soluble higher fatty acid ester of a polyvalent alcohol, the ester containing one or more free hydroxyl groups, to produce a livestock feed having a fluidity of the order of normal whole milk.

3. An adjunct to be added to skimmed milk to produce a livestock feed, and to replace the normal fat content abstracted from whole milk, said adjunct comprising a homogeneous plastic mass containing water, mineral supplements, a vitamin concentrate, and a water-soluble higher fatty acid ester of a polyhydroxy alcohol, the ester containing at least one free hydroxyl group.

CARL W. CHRISTENSEN.
VICTOR CONQUEST.